March 6, 1934.	C. C. BALDWIN	1,949,774
GRAIN THRESHER
Original Filed Jan. 28, 1929
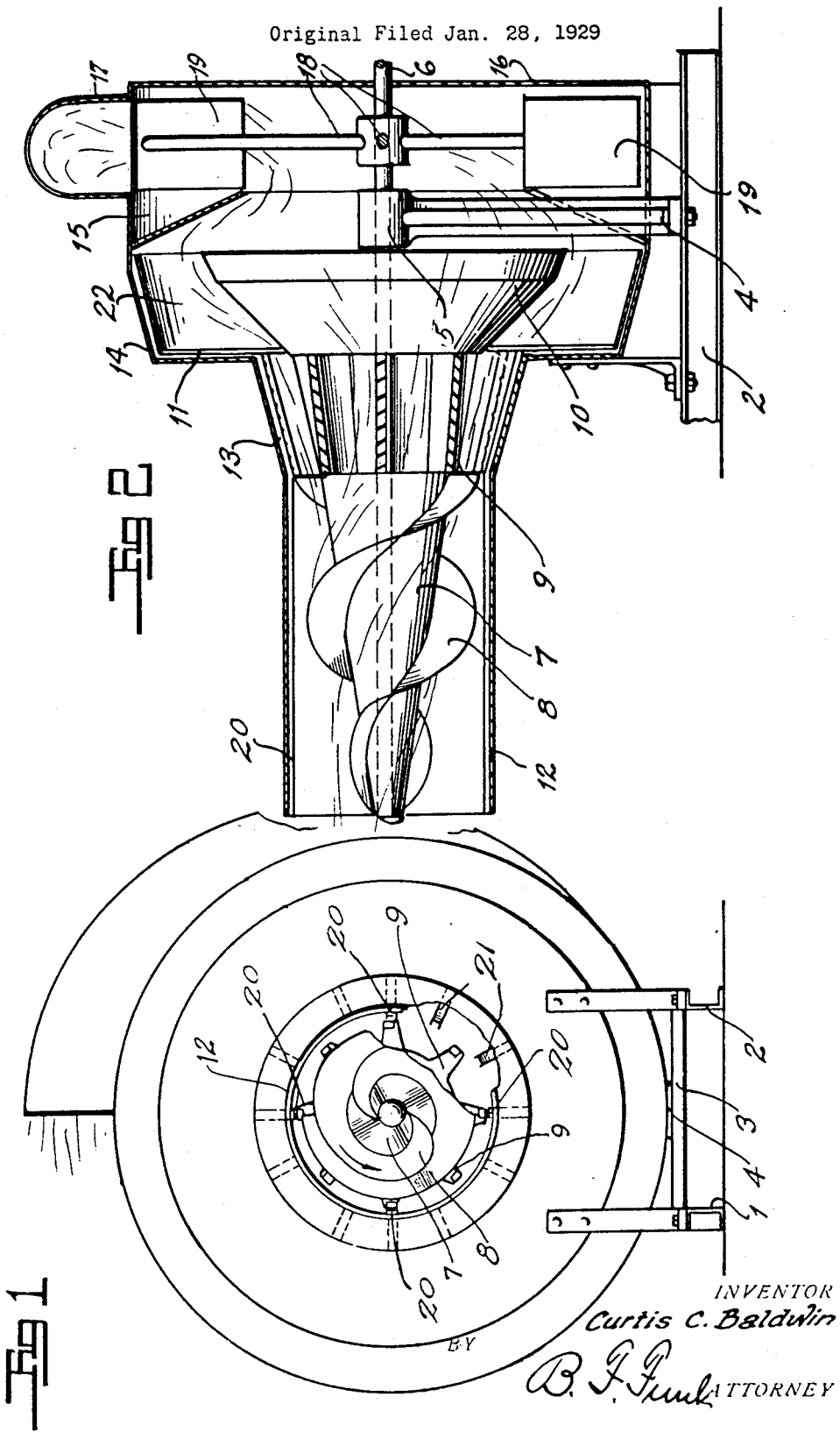
INVENTOR
Curtis C. Baldwin
BY
B. F. Funk ATTORNEY Patented Mar. 6, 1934

1,949,774

UNITED STATES PATENT OFFICE 1,949,774

GRAIN THRESHER

Curtis C. Baldwin, Ottawa, Kans., assignor, by mesne assignments, to Curtis Harvesters, Inc., North Kansas City, Mo., a corporation of Missouri Application January 28, 1929, Serial No. 335,513
Renewed March 13, 1933

5 Claims. (Cl. 130—27)

This invention relates to means for feeding unthreshed grain to a cylinder and concave and the primary object of the invention is to feed the unthreshed grain axially of the cylinder instead of to the periphery of the cylinder as is common practice. By feeding the unthreshed grain into the space between the cylinder and concave by an auger or other suitable conveyor arranged axially of the cylinder, the unthreshed grain can be continuously fed in a circular stream through the cylinder and concave so that the capacity of the machine will be increased over that type in which the unthreshed grain is fed to the periphery and travels approximately 180 degrees around the cylinder before passing into the separator.

In actual practice I have found that a device constructed in accordance with my invention is appreciably more efficient than the older type of construction. In order to appreciate the advantages of my invention, reference should be had to the following description in connection with the accompanying drawing in which:

Fig. 1 is a front elevational view of a device constructed in accordance with my invention, parts being broken away to better illustrate certain other parts and Fig. 2 is a vertical, longitudinal, sectional view through the cylinder and concave, the auger, the bearings and the suction fan being shown in elevation.

Referring now to the drawing by numerals of reference, 1 and 2 designates sills preferably tied together by one or more tie-bars 3. The sills constitute a base for supporting a bearing standard 4 having a bearing 5 to support the horizontal shaft 6 driven by a suitable means not shown. On the front end of the shaft 6 is an elongated cone 7 having auger blades 8 about its periphery and at the base of the cone is a cylinder 9 in rear of which is a conical guide 10 for directing material rearwardly and outwardly into the space formed by the outstanding skirt 11 secured to the cone 10 by spider arms. The auger is surrounded by a cylindrical guide member or spout 12 which has a truncated conical extension 13 surrounding the cylinder 9 and constituting the concave. The cylindrical guide member 12 and the concave 13 are connected together and in turn supported by the cylindrical shell or housing 14 carried by the sills or other suitable base in any appropriate manner. The housing extends rearwardly of the conical supporting member 10 and merges into a fan casing 15 closed at its rear end 16 and having the usual eccentric outlet 17. Within the fan casing are arms 18 carrying truncated fan blades 19, the arms being fastened to the shaft 6. At 90 degrees intervals are longitudinally disposed channels 20 which extend from the entrance end of the cylindrical guide 12 to the inlet end of the concave 13 and in between these channels are similar channels 21 which are co-extensive with the length of the concave and carried thereby.

Unthreshed grain is fed into the cylindrical guide 12 and carried by the auger into the cylinder and concave where the threshing is done. That is, the hulls are broken from the grain kernels. The threshed grain together with the chaff is pulled through the cylinder and concave into the space 22 between the cone 10 and the skirt 11 by the suction of the fan or exhauster in rear thereof and is forced through the outlet 17 into suitable separating mechanism not shown.

It will be apparent that the unthreshed grain is fed into the cylinder and concave in the form of a hollow cylindrical stream and since the cylinder and concave in themselves are cylindrical with the inlet at the truncated portion of the cone and the outlet at the base of the cone, the grain will be subjected to short severe threshing action and in actual practice I have found that a relatively large quantity of unthreshed grain can be quickly passed through the machine and efficiently separated preparatory to having the chaff separated from the grain kernels in a much shorter period than is possible with present day apparatus, this being due to the fact that the grain is fed to all parts of the cylinder and concave axially of the cylinder and concave instead of to the periphery thereof.

What I claim and desire to secure by Letters Patent is:—

1. A centrifugal threshing apparatus comprising, in combination, a rotary shaft, a threshing cylinder mounted on the shaft, a fan carried by the shaft and through which material from the threshing cylinder is discharged, and a passageway extending between the threshing cylinder and the fan, said passageway having an annular distributing member and an annular baffle plate rendering it of circuitous formation in the direction of travel of the threshed material, whereby conglomerate masses of such material are broken down and distributed.

2. A centrifugal threshing apparatus comprising, in combination, a rotary shaft, a threshing cylinder mounted on the shaft, a fan carried by the shaft beyond the threshing cylinder, said fan being provided with truncated blades, a distributor plate disposed between the threshing cylinder and the fan for directing the threshed material in a direction away from the truncated area of the fan, and a baffle constructed and arranged to redirect the material into said truncated area.

3. A centrifugal threshing apparatus comprising, in combination, a single rotary shaft, a screw conveyor, a frustro-conical threshing cylinder, a cone shaped distributing member, and a discharge fan, all of said named members being mounted co-axially on said shaft for rotation therewith.

4. A threshing machine comprising in combination a casing, a shaft rotatably mounted in said casing, a threshing element mounted on said shaft for rotation therewith, coacting threshing means positioned on said element and said casing respectively, a centrifugal impeller plate mounted on said shaft for rotation therewith, and an annular baffle plate carried by said casing positioned in proximity to said centrifugal impeller plate, said impeller plate and said baffle plate forming a circuitous passageway.

5. A centrifugal threshing apparatus comprising in combination a single rotary shaft, a screw conveyor, a threshing cylinder, a cone-shaped distributing member, and a discharge fan, all of said named members being mounted coaxially on said shaft for rotation therewith.

CURTIS C. BALDWIN.